United States Patent
Inoue et al.

(10) Patent No.: US 9,452,426 B2
(45) Date of Patent: Sep. 27, 2016

(54) POLYMER ADSORBENT

(71) Applicant: Nippon Filcon Co., Limited, Inagi-shi, Tokyo (JP)

(72) Inventors: Yoshinori Inoue, Inagi (JP); Takehiro Kajiwara, Inagi (JP); Mitsuru Saito, Inagi (JP)

(73) Assignee: NIPPON FILCON CO., LIMITED, Inagi-shi (JP)

( * ) Notice: Subject to any disclaimer, the term of this patent is extended or adjusted under 35 U.S.C. 154(b) by 0 days.

(21) Appl. No.: 14/374,735

(22) PCT Filed: Jan. 26, 2013

(86) PCT No.: PCT/JP2013/051678
§ 371 (c)(1),
(2) Date: Jul. 25, 2014

(87) PCT Pub. No.: WO2013/111891
PCT Pub. Date: Aug. 1, 2013

(65) Prior Publication Data
US 2014/0332714 A1   Nov. 13, 2014

(30) Foreign Application Priority Data

Jan. 27, 2012 (JP) ................................. 2012-015850

(51) Int. Cl.

| | |
|---|---|
| *B01J 41/12* | (2006.01) |
| *B01J 39/18* | (2006.01) |
| *B01J 20/26* | (2006.01) |
| *B01J 20/30* | (2006.01) |
| *C02F 1/28* | (2006.01) |
| *C08J 3/00* | (2006.01) |
| *C08J 9/26* | (2006.01) |
| *C08J 9/40* | (2006.01) |
| *B01J 39/04* | (2006.01) |
| *B01J 45/00* | (2006.01) |
| *B01J 47/12* | (2006.01) |
| *C02F 101/20* | (2006.01) |

(52) U.S. Cl.
CPC ............. *B01J 39/185* (2013.01); *B01J 20/264* (2013.01); *B01J 20/305* (2013.01); *B01J 20/3007* (2013.01); *B01J 20/3064* (2013.01); *B01J 20/3085* (2013.01); *B01J 39/046* (2013.01); *B01J 41/125* (2013.01); *B01J 45/00* (2013.01); *B01J 47/123* (2013.01); *C02F 1/285* (2013.01); *C08J 3/005* (2013.01); *C08J 9/26* (2013.01); *C08J 9/40* (2013.01); *B01J 2220/445* (2013.01); *C02F 2101/20* (2013.01); *C08J 2201/0464* (2013.01); *C08J 2327/06* (2013.01); *C08J 2400/104* (2013.01); *C08J 2425/14* (2013.01); *C08J 2433/06* (2013.01)

(58) Field of Classification Search
CPC ....................................................... B01J 41/125
See application file for complete search history.

(56) References Cited

U.S. PATENT DOCUMENTS

2012/0132852 A1*   5/2012   Inoue et al. .................. 252/184

OTHER PUBLICATIONS

English machine translation of JP 2011-088047A (2011).*
N. Hojo, "Kireto Jushi/Ion-Kokan Jushi (Chelate Resin/Ion-Exchange Resin)", Kodansha Scientific (1976).
M. Senoo et al., "Ion-Kokan, Kado-Bunri Gijutsu no Kiso (Ion Exchange, Foundation of High Separation Technology)", Kodansha Scientific (1991).
N. Toshima et al, "Kinosei Kobunshi Zairyo no Kagaku (Chemistry of Functional Polymer Material)", Asakura Publishing (1998).
Edited by Y. Kanzaki, Japan Society of Ion Exchange, "Saisentan Ion-Kokan Gijutsu no Subete (All about Latest Ion-Exchange Techniques)", Kogyo Chosakai Publishing (2009).

* cited by examiner

*Primary Examiner* — Peter F Godenschwager
(74) *Attorney, Agent, or Firm* — Westerman, Hattori, Daniels & Adrian, LLP

(57) ABSTRACT

Problem
To provide a method for easily producing an adsorbing material used for the removal and recovery of metals and ions in a solution, which is highly durable and has various adsorptive functional groups and forms applicable for various purposes.

Means for Resolution
A polymer adsorbent for metals and ions, which is highly durable and has various adsorptive functional groups and forms applicable for various purposes, is produced by a) preparing a reactive polymer having a large number of halogenated alkyl groups or glycidyl groups in the molecule, b) preparing a base material polymer insoluble in water and alcohols, c) dissolving the reactive polymer and the base material polymer in an organic solvent to give a mixed solution, d) removing the organic solvent to give a solid carrier in a desired form, and e) allowing a halogenated alkyl group or a glycidyl group in the solid carrier to react with an amine compound having a functional group capable of adsorbing metals and ions, thereby introducing an adsorptive functional group.

2 Claims, 3 Drawing Sheets

POLYMER ADSORBENT

TECHNICAL FIELD

The present invention relates to a polymer adsorbent which can be used for the removal and recovery of a wide range of metals and ions in solutions such as industrial waste water, service water, and environmental water, is highly durable, and has various adsorptive functional groups and forms applicable for various purposes.

BACKGROUND ART

With the expansion of high-tech industry, the ensuring of metal resources including rare metal has become a big issue. Rare metal is not produced in our country and is totally dependent on imports from foreign countries. The price of rare metal dramatically rises or fluctuates. Therefore, along with the ensuring of overseas resources, the development of alternate materials, and the accumulation of some stockpiles, recycling has been an important issue. Meanwhile, although the concentration is low, a large amount of valuable metals are contained also in the high-tech waste, which is called urban mine, and a project for recovering valuable metals from the waste has been in progress. In the construction of such a recovery/recycling system for valuable metals, the development and establishment of an efficient technique for the removal and separation of valuable metals has been urgently needed.

Generally, for the removal and recovery of metals, methods such as aggregation, coprecipitation, solvent extraction, and solid adsorbing materials have been used. In consideration of the facilities, environmental impact, and also recycling, a method that uses a solid adsorbing material, such as an ion-exchange resin and a chelating resin, is effective. The metal adsorbed by such a solid adsorbing material can be recovered relatively easily by acid cleaning or the like, and the acid-cleaned adsorbing material can be used again for the removal and recovery. These adsorbing materials have been widely used for the removal and recovery of metals. In particular, chelating resins have higher affinity than ion-exchange resins and thus can be regarded as optimal adsorbing materials (Nonpatent Documents 1 to 4). A chelating resin is believed to be capable of removing and recovering a heavy metal element in a solution containing high concentrations of salts, which is difficult in the case of an ion-exchange resin. The ability to form a complex with a metal element differs depending on the functional group structure, and thus chelating resins having various functional groups, such as an iminodiacetic acid group, a low-molecular-weight polyamine group, an aminophosphate group, an isothionium group, a dithiocarbamic acid group, and a glucamine group, are commercially available. Among them, a chelating resin having introduced thereinto an iminodiacetic acid group, which is applicable to the adsorption of a wide range of metals, has been mainly used.

A chelating resin is a particulate adsorbing material like activated carbon and ion-exchange resins and has been used in a wide range of fields including a wastewater treatment and a water purification treatment. A water treatment technique using these particulate adsorbing materials has already been established and is expected to be heavily used also in the future. However, because it has a particulate form, such a particulate adsorbing material has to be packed in a specific can and used. Therefore, it may be difficult to adapt to some conditions of use or some installation environments. That is, in order to meet various demands, not only the adsorption characteristics of an adsorbing material are important, but also the adsorbent needs to be usable in various forms including a particulate form. Methods for producing a chelating resin have already been known (Nonpatent Documents 1 to 4).

According to a typical production method, a chloromethyl group is introduced into a crosslinked, particulate polystyrene by a suitable reaction method, and then a chelating compound such as iminodiacetic acid is introduced by a reaction with a chloromethyl group. In addition, it is also possible to introduce a chelating compound using, as a base material resin, particles of a copolymer crosslinked with a monomer having a glycidyl group such as glycidyl methacrylate. The effectiveness of a long-chain amino carboxylic acid group in such a particulate chelating resin has been disclosed (Patent Document 1 and Patent Document 2). According to the disclosure, the chain length of a chelating functional group is increased, whereby the stability constant of the complex is improved, resulting in the formation of a stable complex. Although an increase in the chain length of a functional group is a technique effective in improving adsorption characteristics, because of the particulate form, the use is limited as mentioned above. In addition, although a chelating polymer can be obtained by introducing an amino carboxylic acid group into a linear polymer having a chloromethyl group or a glycidyl group, the polymer thus obtained is water-soluble and thus is difficult to operate as a solid in a particulate form, etc. Therefore, the operativity is even lower than that of particulate ones.

Incidentally, resin-sintered porous bodies obtained by sintering a powder of a thermoplastic resin such as polyethylene, polypropylene, or polystyrene have been used in various filters and also in air diffusion cylinders, fuel induction cores of gas cigarette lighters, ink induction cores of fiber-tipped pens, ink rollers, foaming devices, etc. By adjusting the particle diameter or particle size distribution of a resin powder, which is the raw material, a resin-sintered porous body can be produced as a porous body having a pore size of five to several hundred micrometers and a porosity of 30 to 50%.

When a particulate adsorbing material is sintered using this technique, adsorbing materials of various forms, such as cylindrical, disk-shaped, needle-shaped, conical, and cup-shaped, can be produced. With respect to a sintered adsorbing material sintered with a thermoplastic resin, activated carbon is disclosed in Patent Document 3, an ion-exchange resin is disclosed in Patent Document 4, and a chelating resin is disclosed in Patent Document 5 and Patent Document 6. These techniques are useful to diversify the form or adsorption characteristics of an adsorbing material. However, it is necessary to perform sintering using a special die set according to the form and the size, and thus a wide variety of dies have to be prepared according to a variety of sizes. Therefore, it is difficult to rapidly deal with various needs. In addition, considering the production method or production facilities, continuous/mass production is difficult, except for flat ones.

In order to solve such a problem, for example, Patent Document 7 discloses a fibrous metal-adsorbing material that can be easily processed into various forms and can meet various demands. For example, Patent Document 7 discloses the introduction of a chelating functional group into a fiber material using a chemical grafting method. Patent Documents 8 and 9 disclose radical formation by radiation exposure and the introduction of a chelating functional group by graft polymerization method. Patent Document 10 discloses a method for injecting a low-molecular-weight chelating agent into general-purpose fibers under high-temperature and high-pressure conditions. These chelating fibers are likely to have sufficient functions and show quick-adsorption characteristics, but have production problems. In a chemical grafting method, the kind of graftable fiber is limited, and also the production process is complicated. A radiation grafting method is advantageous in that it can be applied to various fibers unlike the chemical grafting method. However, for the handling of radiation, the operation is performed in a specific environment, and thus it cannot be regarded as a simple and inexpensive production method. In addition, although a chelating agent injection/impregnation method is also advantageous in that various fibers can be used, according to the disclosed conditions, a supercritical fluid such as carbon dioxide is the most effective, and also the pressurizing conditions include an extremely high pressure of 100 atm ($9.8 \times 10^6$ pa) to 250 atm ($2.45 \times 10^7$ pa). Therefore, it cannot be necessarily regarded as a simple production method.

Patent Document 11 discloses a method for producing a fibrous metal-adsorbing material using a blend-spinning method. According to this method, a polymer having chelating ability is subjected to wet blend spinning together with viscose, which allows for mass production at low cost using existing facilities. A nonwoven fabric made of this fibrous metal-adsorbing material shows adsorption capacity according to the amount of blend spinning. Therefore, it is possible to produce adsorbents in various forms by secondary processing (Patent Document 12). Further, use of this method makes it possible to produce an adsorbing material in a membrane form, such as cellophane, or in a power form. The polymer to be blend-spun in this method has to be water-soluble and also reproducible uniformly with viscose. In addition, the adsorption characteristics of a fibrous metal-adsorbing material produced by this method depend on the properties of the polymer to be blend-spun. Therefore, in the production of a fibrous metal-adsorbing material having various adsorption characteristics using a wet blend-spinning method, there is a difficulty in that a novel polymer, which satisfies all of such conditions, has to be synthesized each time. Further, the use of a fibrous metal-adsorbing material obtained by this method is also limited. Generally, a treatment solution that is the subject of metal recovery is an acidic solution, and occasionally contains hydrochloric acid, sulfuric acid, nitric acid, or the like within a concentration range. Rayon is decomposed when exposed to strongly acidic conditions. Therefore, the use of a fibrous metal-adsorbing material using rayon as a base material under acidic conditions is significantly limited. In addition, decomposition also occurs due to microorganisms in the environment, etc. Therefore, it cannot stand long-term use or repeated use several times.

CITATION LIST

Patent Document

Patent Document 1: Japanese Unexamined Application Publication No.2005-213477
Patent Document 2: Japanese Unexamined Application Publication No.2010-194509
Patent Document 3: Japanese Unexamined Application Publication No.02-17989
Patent Document 4: Japanese Unexamined Application Publication No.07-204429
Patent Document 5: Japanese Unexamined Application Publication No.2010-254841
Patent Document 6 : Japanese Unexamined Application Publication No.2010-256225
Patent Document 7: Japanese Unexamined Application Publication No.2001-113272
Patent Document 8: Japanese Patent No. 4119966
Patent Document 9: Japanese Patent No. 3247704
Patent Document 10: Japanese Unexamined Application Publication No.2007-247104
Patent Document 11: Japanese Unexamined Application Publication No.2011-056349
Patent Document 12: Japanese Unexamined Application Publication No.2011-056350, FILCON, nonwoven fabric Non-Patent Documents Non-Patent Document 1: Nobumasa HOJO, "*Kireto Jushi/Ion-Kokan Jushi* (Chelate Resin/Ion-Exchange Resin)", Kodansha Scientific (1976).
Non-Patent Document 2: Manabu SENOO, Mitsuo ABE, Takashi SUZUKI, "*Ion-Kokan, Kodo-Bunri Gijutsu no Kiso* (Ion Exchange, Foundation of High Separation Technology)", Kodansha Scientific (1991).
Non-Patent Document 3: Naoki TOSHIMA, Tsuyoshi ENDO, Ryuichi YAMAMOTO, "*Kinosei Kobunshi Zairyo no Kagaku* (Chemistry of Functional Polymer Material)", Asakura Publishing (1998).
Non-Patent Document 4: Edited by Yasushi KANZAKI, Japan Society of Ion Exchange, "*Saisentan Ion-Kokan Gijutsu no Subete* (All about Latest Ion-Exchange Techniques)", Kogyo Chosakai Publishing (2009).

SUMMARY OF THE INVENTION

Problems that the Invention is to Solve

The present invention has been accomplished in view of the problems mentioned above. An object of the present invention is to provide, in an adsorbing material used for the removal and recovery of metals and ions in a solution, a metal- and ion-adsorbing polymer adsorbent that allows for the easy production of an adsorbing material, which is highly durable and has various adsorptive functional groups and forms applicable for various purposes.

Means for Solving the Problems

The present inventors have conducted intensive research. As a result, they have found that a polymer adsorbing material that is highly durable and has various adsorptive functional groups and forms applicable for various purposes can be easily produced by dissolving a reactive polymer having a large number of halogenated alkyl groups or glycidyl groups and a base material polymer insoluble in water and alcohols and having no halogenated alkyl group or glycidyl group in an organic solvent capable of dissolving each, thereby forming a uniform mixed solution; removing the organic solvent from the mixed solution, thereby forming a solidified carrier in a desired form; and allowing a halogenated alkyl group or a glycidyl group in the solidified carrier to react with a metal- and ion-adsorbing amine compound.

The present invention relates to a metal- and ion-adsorbing polymer adsorbent, characterized by being produced by dissolving a reactive polymer having a large number of halogenated alkyl groups or glycidyl groups and a base material polymer insoluble in water and alcohols and having no halogenated alkyl group or glycidyl group in an organic solvent capable of dissolving each, thereby forming a uniform mixed solution; removing the organic solvent from the mixed solution, thereby forming a solidified carrier in a desired form (hereinafter, sometimes simply referred to as "solid carrier"); and allowing a halogenated alkyl group or a glycidyl group in the solidified carrier to react with a metal- and ion-adsorbing amine compound, thereby introducing an adsorptive functional group.

Here, the metal- and ion-adsorbing amine compound is ethylenediamine, polyethyleneimine, polyallylamine, a partially carboxymethylated compound thereof, or a polycarboxylic acid or polyamide having an amino group or an imino group.

Further, in the case where the reactive polymer and the base material polymer are dissolved in an organic solvent capable of dissolving each to form a uniform mixed solution, a pore-forming agent that is soluble in water or alcohols is mixed for imparting porosity to a solidified carrier after the removal of the organic solvent, then the solidified carrier after the removal of the organic solvent is washed with water or an alcohol to remove the pore-forming agent, thereby forming a porous, solidified carrier, and further it is allowed to react with the metal- and ion-adsorbing amine compound mentioned above, thereby giving a metal- and ion-adsorbing polymer adsorbent.

As the reactive polymer having a large number of halogenated alkyl groups or glycidyl groups, a homopolymer of a monomer having a halogenated alkyl group or a glycidyl group or a copolymer with another monomer is used. The halogenated alkyl group or glycidyl group reacts with an amino group or an imino group in the metal- and ion-adsorbing amine compound (hereinafter sometimes simply referred to as "adsorptive amine compound"), whereby the adsorptive amine compound is introduced into the solidified carrier as a metal- and ion-adsorbing functional group, thereby giving a polymer adsorbent.

In addition, the base material polymer insoluble in water and alcohols and having no halogenated alkyl group or glycidyl group is a polymer that does not dissolve in water and alcohols. This is because the polymer adsorbent of the present invention is used mainly for the adsorption of metals and ions in an aqueous sample and also because the reaction solution for the reaction of the adsorptive amine compound is water or an alcohol. Further, for the reaction between the adsorptive amine compound and a halogenated alkyl group or a glycidyl group in the reactive polymer, the base material polymer used has no halogenated alkyl group or glycidyl group.

The pore-forming agent is used in order to increase the area of the adsorption surface of the polymer adsorbent. For removing the pore-forming agent by washing the solidified carrier after the removal of the organic solvent with water or an alcohol to impart porosity to the carrier, the pore-forming agent used is soluble in water and alcohols.

Further, as the metal- and ion-adsorbing amine compound, it is preferable to use ethylenediamine, polyethyleneimine, polyallylamine, a partially carboxymethylated compound thereof, or a polycarboxylic acid or polyamide having an amino group or an imino group.

The reactive polymer, the metal- and ion-adsorbing amine compound, and the pore-forming agent will be described in further detail in the section of Mode for Carrying Out the Invention.

Advantage of the Invention

The present invention makes it possible to easily produce a metal- and ion-adsorbing polymer adsorbent having excellent characteristics as follows, for example.

The reactive polymer is uniformly mixed with the base material polymer and thus is stably maintained in the base material polymer. Therefore, the metal and ion adsorption performance is maintained over a long period of time without the loss of the adsorptive amine compound that has reacted with the reactive polymer.

The base material polymer is insoluble in water and alcohols and thus does not dissolve in a treatment liquid or swell during the operation of the removal and recovery of metals and ions from the treatment liquid, and its shape is maintained for a long period of time. At the same time, acid-resistant and alkali-resistant materials can be used, and thus durability is greatly improved regardless of the condition of the treatment liquid. In addition, it is easy to shape various form such as films, thin films, pellets, rods, fibers, and nanofibers. Therefore, a desired form can be easily shaped.

Various kinds can be used as the metal- and ion-adsorbing amine compound. Therefore, by changing the compound, the metal and ion adsorption characteristics can be enhanced or adjusted.

Further, the use of the pore-forming agent makes it possible to freely adjust the adsorption surface area from large ones to desired ones. Therefore, the desired amount of metal and ion adsorption can be easily achieved.

As described above, according to the present invention, a polymer adsorbent for metals and ions, which is highly durable and has various adsorptive functional groups, forms, and adsorption performance applicable for various purposes, can be produced by dissolving a reactive polymer having a large number of halogenated alkyl groups or glycidyl groups and a base material polymer insoluble in water and alcohols and having no halogenated alkyl group or glycidyl group in an organic solvent capable of dissolving each, thereby forming a uniform mixed solution; removing the organic solvent from the mixed solution, thereby forming a solid in a desired form; and allowing a halogenated alkyl group or a glycidyl group in the solidified carrier to react with a metal- and ion-adsorbing amine compound, thereby introducing a metal- and ion-adsorbing functional group.

DETAILED DESCRIPTION OF THE PREFERRED EMBODIMENTS

According to the present invention, a polymer adsorbent for metals and ions, which is highly durable and has various adsorptive functional groups and forms applicable for various purposes, can be produced by dissolving a reactive polymer having a large number of halogenated alkyl groups or glycidyl groups and a base material polymer insoluble in water and alcohols and having no halogenated alkyl group or glycidyl group in an organic solvent capable of dissolving each, thereby forming a uniform mixed solution; removing the organic solvent from the mixed solution, thereby forming a solidified carrier in a desired form; and allowing a halogenated alkyl group or a glycidyl group in the solidified carrier to react with a metal- and ion-adsorbing amine compound, thereby introducing an adsorptive functional group.

The reactive polymer having a large number of halogenated alkyl groups or glycidyl groups is a homopolymer of a monomer having a halogenated alkyl group or a glycidyl group or a copolymer with another monomer, which can react with an amino group or an imino group. Examples of monomers having a halogenated alkyl group include chloromethyl styrene, 3-chloro-2-hydroxypropyl methacrylate, 3-chloro-2-hydroxypropyl acrylate, 2-chloroethyl methacrylate, and 2-chloroethyl acrylate. Examples of monomers having a glycidyl group include glycidylmethacrylate, glycidyl acrylate, and vinylbenzyl glycidyl ether. In the present invention, a homopolymer of such a monomer is mixed with the base material polymer. In addition, copolymers of these monomers can also be used in the present invention. Examples of monomers copolymerizable with these monomers include styrenes, methacrylic acid esters, and acrylic acid esters. An increase in the proportion of such a copolymerizable monomer leads to a decrease in the amount of adsorptive functional groups introduced. Therefore, the proportion of a monomer having a halogenated alkyl group or a glycidyl group in the reactive polymer is 10 to 100 wt %, preferably 20 to 100 wt %. In addition, the molecular weight of the reactive polymer having a large number of halogenated alkyl groups or glycidyl groups is not particularly limited. However, a high molecular weight leads to a polymer adsorbent with high brittleness and low flexibility. In addition, in the case where the molecular weight is too low, there is a possibility of elution during use. These problems depend on the properties and proportions of the monomer having a halogenated alkyl group or a glycidyl group or the copolymerizable monomer, and thus the molecular weight cannot be strictly set. However, a polymer having a molecular weight of 10,000 to hundreds of thousands, which is easy to synthesize and obtain, is used.

The base material polymer is a polymer that does not dissolve in water and alcohols but dissolves in an organic solvent that dissolves the reactive polymer having a large number of halogenated alkyl groups or glycidyl groups. Because the polymer adsorbent of the present invention is mainly used for the adsorption of metals and ions in an aqueous sample, and also because the reaction solution at the time of the adsorptive functional group introduction reaction is water or an alcohol, a polymer that does not dissolve in water and alcohols is required.

Examples of base material polymers that satisfy such conditions include general-purpose resins such as polyacrylonitrile, acrylonitrile-styrene resin (AS resin), acrylonitrile-vinyl chloride resin, acrylonitrile-butadiene-styrene resin (ABS resin), polyvinyl acetate, polyvinyl chloride, and cellulose acetate. However, the selection is made in consideration of the characteristics of the final polymer adsorbent. For example, in the case where a polymer adsorbent in the form of a flexible film or fibers is to be produced, polyacrylonitrile, polyvinyl acetate, polyvinyl chloride, acrylonitrile-vinyl chloride resin, cellulose acetate, or the like is used.

In addition, the organic solvent that dissolves both of the reactive polymer and the base material polymer is not particularly limited. However, in consideration of the ease of solvent removal and the decomposition of halogenated alkyl groups or glycidyl groups, an organic solvent having a boiling point of 180° C. or less, preferably 160° C. or less, is used. Examples of organic solvents capable of dissolving both of the reactive polymer and the base material polymer include aromatic solvents such as toluene, cyclic ether solvents such as tetrahydrofuran, chlorine solvents such as chloroform, ester solvents such as ethyl acetate, ketone solvents such as methyl ethyl ketone, and further amide solvents such as dimethylformamide. They are suitably selected according to the solubility of the reactive polymer and the base material polymer.

Further, according to the condition of the treatment liquid, it is also possible to select and use an alkali-resistant material or an acid-resistant material. This allows for application to a wide range of treatment liquid conditions, and also durability can be significantly improved.

The metal adsorption capacity of the polymer adsorbent depends on the proportion of the reactive polymer having a large number of halogenated alkyl groups or glycidyl groups mixed with the base material polymer and also on the amount of adsorptive functional groups introduced. In the case where the amount of the reactive polymer mixed is small, the amount of adsorptive functional groups introduced is small, resulting in low metal adsorption capacity.

Meanwhile, in the case where the amount of the reactive polymer mixed is large, a large number of adsorptive functional groups can be introduced, whereby a polymer adsorbent having high metal adsorption capacity can be obtained. However, because the reactive polymer used in the present invention has poor flexibility (high brittleness), the polymer adsorbent obtained may also lack flexibility. Especially in the case where the adsorbent is formed into fibers by a dry spinning method, stretching may be impossible. In addition, the reactive polymer is present uniformly with the base material polymer in the solidified carrier obtained. Therefore, adsorptive functional groups cannot be introduced into all the reactive functional groups in the reactive polymer mixed, but adsorptive functional groups are introduced into reactive functional groups that are present in the surface. Therefore, the mixing proportion needs to be adjusted according to the purpose of use and the conditions of use. In the present invention, the amount of the reactive polymer having a large number of halogenated alkyl groups or glycidyl groups mixed is 10 to 80 wt %, preferably 20 to 70 wt %, in the solidified carrier after the removal of the solvent.

An example of the compound for introducing an adsorptive functional group into the solidified carrier containing the reactive polymer having a large number of halogenated alkyl groups or glycidyl groups is an amine compound having a functional group capable of adsorbing metals and ions.

The preferred first form thereof is ethylenediamine, polyethyleneimine, or polyallylamine. These compounds can each function as a metal-chelating group and an anion-exchange group. In addition, use of such a long-chain polymeric amine makes it possible to improve the stability constant of a complex with the metal. Further, after the introduction, these functional groups can be carboxymethylated using halogenated acetic acid to give chelating functional groups usable for the adsorption of a wide range of metals. Further, they may also be acetylated with acetic anhydride to give amide groups, which can be used as an adsorbing material for noble metals.

In addition, it is possible to allow a halogenated alkyl compound to react to give a tertiary or quaternary amino group or imino group, thereby improving the anion-exchange ability. Incidentally, a plurality of amino groups or imino groups are present in such a polyamine. Therefore, one molecule can be bonded to a plurality of reactive functional groups. That is, the reactive polymer having a large number of halogenated alkyl groups or glycidyl groups in the solid carrier can be crosslinked, whereby the reactive polymer can be prevented from elution or desorption from the base material polymer.

The second form of an amine compound is a partially carboxymethylated polyamine having remaining therein an amino group or an imino group of the amine compound of the first form. It has been mentioned above that polyethyleneimine and polyallylamine can be carboxymethylated after introduction, but it is also possible to introduce a compound obtained by the partial carboxymethylation of polyethyleneimine and polyallylamine with halogenated acetic acid in advance to allow an amino group or an imino group to remain therein. For the partial carboxymethylation to allow an amino group or an imino group to remain, it is possible to perform carboxymethylation after attaching a protective group to some of amino groups or imino groups in advance, and it is also possible to carry out the reaction using a carboxymethylation reagent in a low proportion relative to polyethyleneimine and polyallylamine. Incidentally, also in the case where a carboxymethylated polyamine having remaining therein an amino group or an imino group is allowed to react, when a plurality of amino groups or imino groups are present, the above crosslinking reaction takes place.

The third form of an amine compound is a polycarboxylic acid or polyamide having an amino group or an imino group. These functional groups can also be used for the adsorption of metals and ions. A carboxylic acid functions as a weak cation-exchange group and can adsorb cations and metal cations. A dicarboxylic acid, such as a succinic acid type, functions as a metal-chelating functional group. An amide group can be used for the adsorption of noble metals. Examples of polycarboxylic acids having an amino group or an imino group include copolymers such as allylamine-maleic acid, diallylamine-maleic acid, allylamine-acrylic acid, and diallylamine-acrylic acid. In addition, examples of polyamides having an amino group or an imino group include copolymers such as allylamine-acrylamide and diallylamine-acrylamide. Also in the case where these compounds are allowed to react, the above crosslinking reaction takes place.

Examples of forms of polymer adsorbents in the present invention include films, thin films, particles, pellets, rods, fibers, and nanofibers. According to the present invention, by the removal of the organic solvent from a mixed solution of the reactive polymer and the base material polymer, a solid carrier having reactive functional groups in which the reactive polymer is uniformly maintained is obtained. However, it is possible to obtain a solid carrier in a desired form using a known method during the removal of the solvent.

A polymer adsorbent in the form of a film or a thin film can be prepared by preparing a mixed solution of the reactive polymer and the base material polymer, adjusting the viscosity, forming a solid carrier in the form of a film or a thin film using various known solution film formation methods including a known solution-casting film formation method, and then introducing an adsorptive functional group.

A polymer adsorbent in the form of particles can be obtained by preparing a mixed solution of the reactive polymer and the base material polymer, removing the solvent, grinding the obtained solid carrier using a grinder such as a ball mill to form a solid carrier in the form of particles, and then introducing an adsorptive functional group.

A polymer adsorbent in the form of pellets or rods can be prepared by preparing a mixed solution of the reactive polymer and the base material polymer, adjusting the viscosity, removing the organic solvent while extruding the mixed solution from a nozzle having a suitable diameter to form a solid carrier in the form of pellets or rods, and then introducing an adsorptive functional group.

A polymer adsorbent in the form of fibers can be prepared by preparing a mixed solution of the reactive polymer and the base material polymer, forming a solid carrier in the form of fibers by a known dry spinning method, and then introducing an adsorptive functional group. A polymer adsorbent in the form of nanofibers can also be prepared by a similar method, including preparing a mixed solution of the reactive polymer and the base material polymer, forming a solid carrier in the form of nanofibers by a known electrospinning method, and introducing an adsorptive functional group. As a result, it is possible to obtain a polymer adsorbent in the form of a nonwoven fabric having a large surface area made of fibers having a small fiber diameter. In addition, in the production of polymer adsorbents in these forms, in order to further improve flexibility, plasticity, weatherability, and the like, it is also possible to obtain a solid carrier by adding a suitable additive to a mixed solution of the reactive polymer and the base material polymer.

The solidified carrier obtained in the present invention has micropores produced during the removal of the solvent. However, because the pore size does not allow for the sufficient penetration of a non-adsorbing component, the effective adsorption surface area is not large. Thus, when a pore-forming agent for forming pores to impart porosity is added to a mixed solution of the reactive polymer and the base material polymer, a porous, solidified carrier having a large effective adsorption surface area can be obtained. That is, a pore-forming agent, which is soluble in the organic solvent used to prepare the mixed solution and is also soluble in water and alcohols, is mixed and dissolved in the mixed solution of the reactive polymer and the base material polymer to form a uniform mixed solution, and then the organic solvent is removed from the mixed solution to form a solidified carrier in a desired form, followed by washing with water or an alcohol to remove the pore-forming agent. As a result, a porous, solid carrier can be obtained. Subsequently, an adsorptive functional group can be introduced into a halogenated alkyl group or a glycidyl group in the porous, solidified carrier to give a porous polymer adsorbent. Examples of compounds that are soluble in the organic solvent capable of dissolving the reactive polymer and the base material polymer and can be removed by washing with water or an alcohol include polymers such as polyethylene glycol, polyethylene glycol alkyl(aryl) ether, polyvinyl alcohol, polyvinyl pyrrolidone, and polyvinyl acetate and long-chain alkyl alcohols such as dodecanol. By using this method, the specific surface area of the polymer adsorbent can be increased, making it possible to increase the adsorption capacity per unit weight. The method for imparting porosity can be applied to the various forms mentioned above, that is, films, thin films, particles, pellets, rods, fibers, nanofibers, and the like. However, in the case where a solidified carrier in the form of fibers is obtained, because the fiber form is obtained by a known dry spinning method, there may be an inconvenience in that the impartation of porosity leads to insufficient strength, making it impossible to perform stretching, for example. Therefore, in many cases, it is more effective to increase the surface area by modifying the fiber cross-section. Although this is also applicable to a solidified carrier in the form of nanofibers, there is a possibility that the addition of a pore-forming agent leads to the formation of short fibers having a low aspect ratio, which may be inconvenient for some applications. Therefore, it is more preferable to adjust the surface area by adjusting the fiber diameter.

The introduction of an adsorptive functional group into the reactive functional group on the surface of the solidified carrier is performed by immersing the solidified carrier in a solution having dissolved therein a metal- and ion-adsorbing amine compound. The metal- and ion-adsorbing amine compound is bonded to the solidified carrier by the reaction between a halogenated alkyl group or a glycidyl group with an amino group or an imino group. In the case of a glycidyl group, in order to improve reactivity, it may react with hydrochloric acid in advance to form chlorhydrin. The solution that dissolves the amine compound may be an aqueous solution, but is preferably a solvent that uniformly disperses the solidified carrier or a solvent having high affinity for the solidified carrier. In case where the affinity is low, the rate of reaction with a halogenated alkyl group or a glycidyl group on the surface of the solidified carrier is reduced. Therefore, it is preferable to carry out the reaction in a solution having added thereto an alcohol or the like to increase the affinity or in an alcohol solution, in which the solidified carrier does not dissolve. Further, heating may also be performed as necessary. After the reaction, unreacted halogenated alkyl groups or glycidyl groups remain in the solidified carrier, and it is possible to perform a post-treatment. For example, a hydroxyl group may be introduced by a treatment with alkali or acid, and it is also possible to introduce an amino group, a carboxyl group, a sulfo group, or the like.

Next, the present invention will be described with reference to the examples, but the present invention is not limited thereto.

EXAMPLE 1

Figure 1:
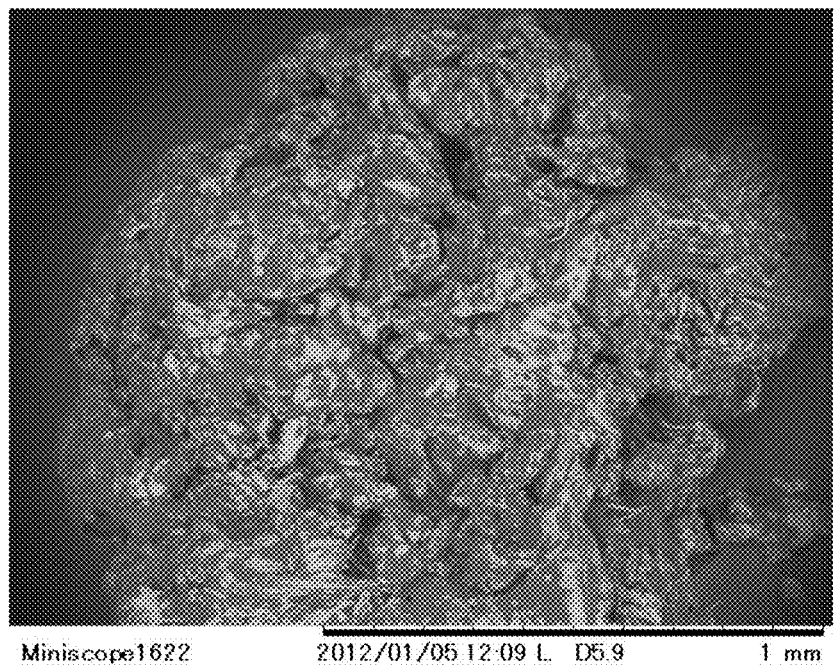
FIG. 1 shows an electron micrograph of a particulate polymer adsorbent having added thereto polyvinyl acetate as a pore regulator.
Figure 2:
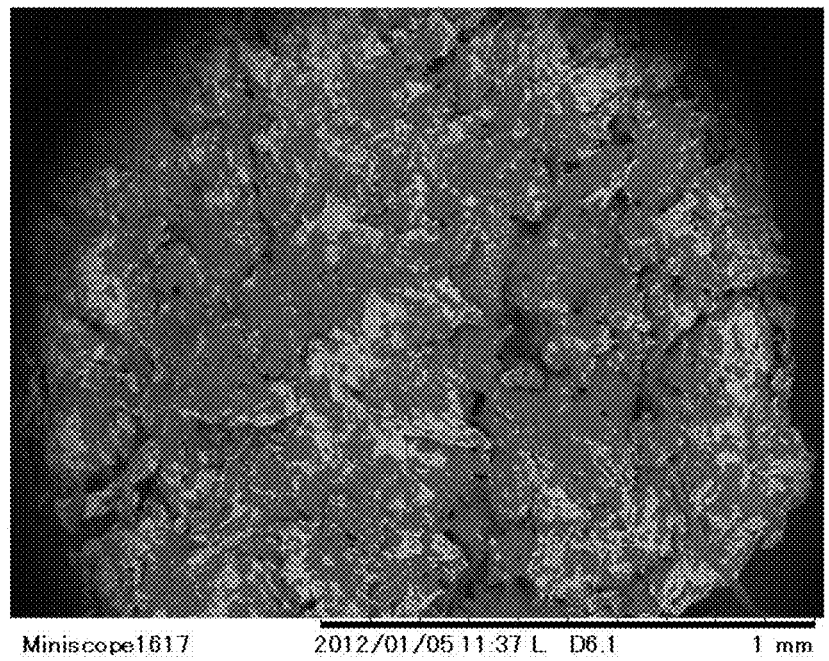
FIG. 2 shows an electron micrograph of a particulate polymer adsorbent having added thereto Triton X-100 as a pore regulator.
Figure 3:
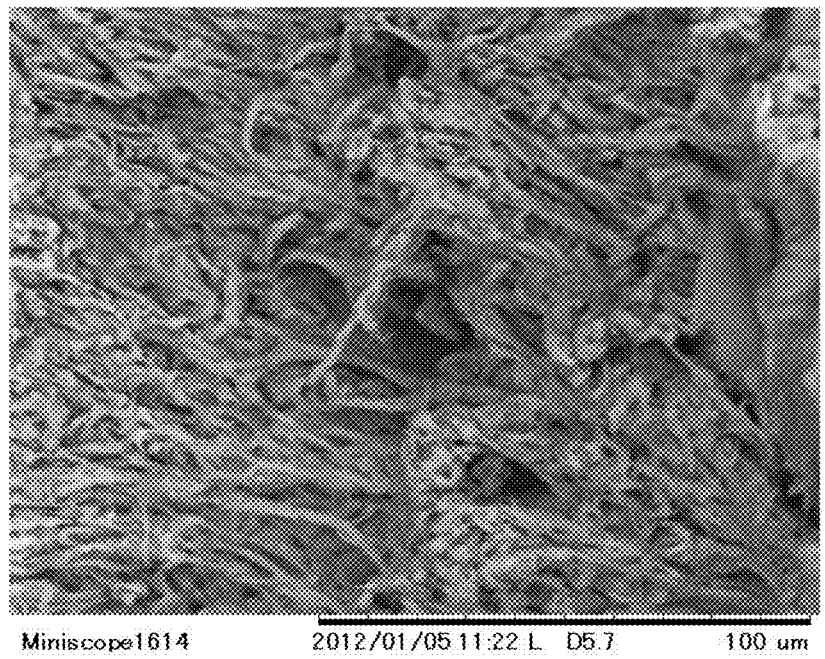
FIG. 3 show an electron micrograph of a particulate polymer adsorbent having no pore regulator added thereto.

10 g of polyvinyl chloride (manufactured by Wako Pure Chemical Industries, polymerization degree: about 1,100), 6 g of a glycidyl-group-containing polymer (manufactured by NOF Corporation, MARPROOF, styrene-based, molecular weight: about 20,000, epoxy value: 310 g/eq), and 4 g of a pore-forming agent were dissolved in 100 mL of tetrahydrofuran (THF) to give a uniform polymer solution. As the pore-forming agent, polyvinyl acetate (manufactured by Wako Pure Chemical Industries, polymerization degree: about 1,500) and polyoxyethylene octylphenyl ether (Triton X-100, manufactured by Wako Pure Chemical Industries, polyoxyethylene polymerization degree: about 10) were used. THF was slowly removed from the mixed solution under reduced pressure with stirring to give a viscous liquid and then transferred to a glass container to give a 2-mm-thick polymer mass. The polymer mass was coarsely crushed and then ground using a ball mill. The obtained crushed particles were classified through a standard sieve to 90 to 250 μm. The crushed particles after classification were dispersed in methanol, and the pore-forming agent was washed away with stirring. The particles after washing were immersed in a 30% aqueous isopropyl alcohol solution containing 10% pentaethylenehexamine and then allowed to react at 40° C. for 4 hours, thereby introducing pentaethylenehexamine. The reaction was followed by washing with pure water, thereby giving a particulate polymer adsorbent having introduced thereinto pentaethylenehexamine. The three kinds of particulate polymer adsorbents obtained were each immersed in a 20 ppm copper sulfate solution (adjusted to pH 5.5) to adsorb copper. The amount of copper adsorbed by each particulate polymer adsorbent was determined from the amount of copper loss from the copper solution. The results are shown in Table 1. The three kinds of particulate polymer adsorbents obtained clearly adsorbed copper. However, the value was obviously higher in the adsorbents prepared using a pore-forming agent. The specific surface area of the three kinds of particulate polymer adsorbents was measured using Beckman Coulter SA3100 Surface Area Analyzer. The results are shown in Table 1. The specific surface area of the particulate polymer adsorbent having no pore regulator added thereto was immeasurable. The results show that the amount of copper adsorbed by each particulate polymer adsorbent depends on the specific surface area of the particulate adsorbent. In addition, FIGS. 1 and 2 show electron micrographs of particulate polymer adsorbents prepared using a pore-forming agent. As is obvious from the photographs, it is shown that the addition of a pore regulator creates pores in the form of holes or crevasses. Incidentally, in the particulate polymer adsorbent having no pore regulator added thereto, pores were not clearly observed at the same magnification, and thus its electron micrograph was taken at a higher magnification. The result is shown in FIG. 3. The surface condition was like melt-solidified bundles of short fibers, and a shallow pore-like structure due to the entanglement of the fibers was partially observed. The obtained particulate polymer adsorbent was immersed in 3 M nitric acid for 50 hours. After immersion, it was washed with water, and the amount of copper adsorbed was determined again. The amount of adsorption did not decrease even after the immersion in nitric acid and washing, and a decrease in the performance under acidic conditions was not observed.

TABLE 1

Comparison of the Amount of Metal Adsorption of Particulate Polymer Adsorbent

| Pore-Forming Agent | Not Added | Polyvinyl Acetate | Triton X-100 |
|---|---|---|---|
| Copper Adsorption Amount mg/g | 1.77 | 6.48 | 6.64 |
| Specific Surface Area m²/g | — | 5.4 | 5.6 |
| Copper Adsorption Amount after Immersion in Nitric Acid and Washing mg/g | 1.72 | 6.50 | 6.63 |

EXAMPLE 2

70 g of polyvinyl chloride (manufactured by Wako Pure Chemical Industries, polymerization degree: about 1,100) and 30 g of a glycidyl-group-containing polymer (manufactured by NOF Corporation, MARPROOF, molecular weight: acrylic, about 12,000, epoxy value: 170 g/eq) were dissolved in 250 mL of tetrahydrofuran (THF) to give a uniform polymer solution. The solution was applied onto a glass plate, and THF was naturally removed slowly overnight to give a 0.3-mm-thick film. The film was cut to a 30 mm×30 mm square and then immersed in a 30% aqueous isopropyl alcohol solution containing 10% a polyamine to carry out a reaction at 40° C. for 4 hours, thereby introducing the polyamine. As the polyamine, ethylenediamine, pentaethylenehexamine, and polyethyleneimine (molecular weight: 600) were used. The polyamine reaction was followed by washing with pure water, thereby giving a film-like polymer adsorbent having a polyamine introduced thereinto. The three kinds of film-like polymer adsorbents obtained were each immersed in a 20 ppm copper sulfate solution (adjusted to pH 5.5) to adsorb copper. The amount of copper adsorbed by each film-like polymer adsorbent was determined from the amount of copper loss from the copper solution. The results are shown in Table 2. The obtained film-like polymer adsorbents clearly adsorbed copper. However, the amount of adsorption varied depending on the kind of polyamine introduced. In this examination, the amount of copper adsorbed was the highest in the adsorbent having pentaethylenehexamine introduced thereinto. This is presumed to be because an increase in the molecular weight of a polyamine decreases the reaction rate. It is also presumed that because the chain length of pentaethylenehexamine is longer than that of ethylenediamine, one molecule adsorbs a plurality of coppers, resulting in the high value. The obtained film-like polymer adsorbents were each immersed in 3 M nitric acid for 50 hours. After immersion, they were washed with water, and the amount of copper adsorbed was determined again. The results are as shown in Table 2. The amount of adsorption did not decrease even after the immersion in nitric acid and washing, and a decrease in the performance under acidic conditions was not observed.

TABLE 2

Comparison of the Amount of Metal Adsorption of Film-Like Polymer Adsorbent

| Introduced Polyamine | Ethylene-diamine | Pentaethylene-hexamine | Polyethylene-imine |
|---|---|---|---|
| Copper Adsorption Amount mg/g | 3.56 | 4.95 | 2.04 |
| Flexibility | Low | Medium | High |
| Copper Adsorption Amount after Immersion in Nitric Acid and Washing mg/g | 3.51 | 5.09 | 2.01 |

INDUSTRIAL APPLICABILITY

According to the present invention, a polymer adsorbent for the removal and recovery of metals and ions, which is highly durable and has various adsorptive functional groups and forms applicable for various purposes, can be produced easily by a simple method including a) preparing a reactive polymer having a large number of halogenated alkyl groups or glycidyl groups in the molecule, b) preparing a base material polymer insoluble in water and alcohols, c) dissolving the reactive polymer and the base material polymer in an organic solvent to give a mixed solution, d) removing the organic solvent to give a solid carrier in a desired form, and e) allowing a halogenated alkyl group or a glycidyl group in the solid carrier to react with a metal- and ion-adsorbing amine compound, thereby introducing an adsorptive functional group. The reactive polymer having introduced thereinto an adsorptive functional group in the polymer adsorbent obtained by the present invention is stably maintained by the base material polymer that forms the backbone of the solidified carrier, and is also crosslinked by the amine compound. Therefore, the polymer adsorbent can be repeatedly used without the elution of the reactive polymer. In addition, it is possible to introduce various adsorptive functional groups into the reactive functional groups of the reactive polymer mixed with the base material polymer, that is, the reactive functional groups on the surface of the solidified carrier obtained by the removal of the organic solvent. Therefore, various polymer adsorbents having different adsorption characteristics can be easily formed. Further, by selecting the physical properties of the base material polymer according to the purpose of use, it is possible to produce a polymer adsorbent that can be used for the adsorption and recovery of metals and ions from various solutions having different liquid properties, such as acidic and alkaline solutions, as well as aqueous solutions containing an organic solvent.

The invention claimed is:

1. A metal- and ion-adsorbing polymer adsorbent, produced by:
    dissolving a reactive polymer having halogenated alkyl groups or glycidyl groups and a base material polymer insoluble in water and alcohols and having no halogenated alkyl group or glycidyl group in an organic solvent capable of dissolving both of the reactive polymer and the base material polymer, thereby forming a uniform mixed solution;
    removing the organic solvent from the mixed solution, thereby forming a solidified carrier in a desired form; and
    allowing the halogenated alkyl groups or the glycidyl groups in the solidified carrier to react with a metal- and ion-adsorbing amine compound having amino groups or imino groups, thereby introducing an adsorptive functional group,
    wherein the metal- and ion-adsorbing amine compound is selected from ethylenediamine, polyethyleneimine, polyallylamine, a partially carboxymethylated compound thereof or a polycarboxylic acid or polyamide having an amino group or an imino group, and
    wherein the reactive polymer is crosslinked with the metal- and ion-adsorbing amine compound in the solidified carrier by the reaction between the halogenated alkyl groups or the glycidyl groups of the reactive polymer and the amino groups or the imino groups of the metal- and ion-adsorbing amine compound.

2. A metal- and ion-adsorbing polymer adsorbent, produced by:
    dissolving a reactive polymer having halogenated alkyl groups or glycidyl groups and a base material polymer insoluble in water and alcohols and having no halogenated alkyl group or glycidyl group, further mixing a pore-forming agent for imparting porosity to a solidified carrier after the removal of an organic solvent;
    removing the organic solvent from the mixed solution, thereby forming a solidified carrier in a desired form;
    removing the pore-forming agent by washing with water or an alcohol, thereby forming a porous, solidified carrier; and
    allowing the halogenated alkyl groups or the glycidyl groups in the solidified carrier to react with a metal- and ion-adsorbing amine compound having amino groups or imino groups, thereby introducing an adsorptive functional group,
    wherein the metal- and ion-adsorbing amine compound selected from ethylenediamine, polyethyleneimine, polyallylamine, a partially carboxymethylated compound thereof or a polycarboxylic acid or polyamide having an amino group or an imino group, and
    wherein the reactive polymer is crosslinked with the metal- and ion-adsorbing amine compound in the solidified carrier by the reaction between the halogenated alkyl groups or the glycidyl groups of the reactive polymer and the amino groups or the imino groups of the metal- and ion-adsorbing amine compound.

* * * * *